United States Patent [19]

Bradley

[11] 3,959,839
[45] June 1, 1976

[54] SCRAPING APPARATUS
[75] Inventor: Steven Y. Bradley, Geneva, Ill.
[73] Assignee: Masonite Corporation, Chicago, Ill.
[22] Filed: June 23, 1975
[21] Appl. No.: 589,207

[52] U.S. Cl. .......................... 15/93 R; 118/DIG. 9
[51] Int. Cl.² .......................................... B23D 1/00
[58] Field of Search .............. 15/93 R, 97 R, 93 C; 118/72, 100, DIG. 9; 83/5, 699; 144/115; 101/169

[56] References Cited
UNITED STATES PATENTS
3,488,789   1/1970   Gross et al. ........................ 15/93 R

*Primary Examiner*—Edward L. Roberts
*Attorney, Agent, or Firm*—Mason, Kolehmainen, Rathburn & Wyss

[57] ABSTRACT

Apparatus for scraping a surface of a substrate comprising substrate support means for supporting a substrate and defining a path of trovel of said substrate through said apparatus, scraping blade support means for supporting a flexible scraping blade for contact against a surface of said substrate moving along said path, a flexible scroping blade in said scraping blade support means to form an arcuately curved scroping edge in contact against said substrate, and means for adjusting the contacting pressure of said arcuate scroping blade edge against said surface of said substrate.

14 Claims, 13 Drawing Figures

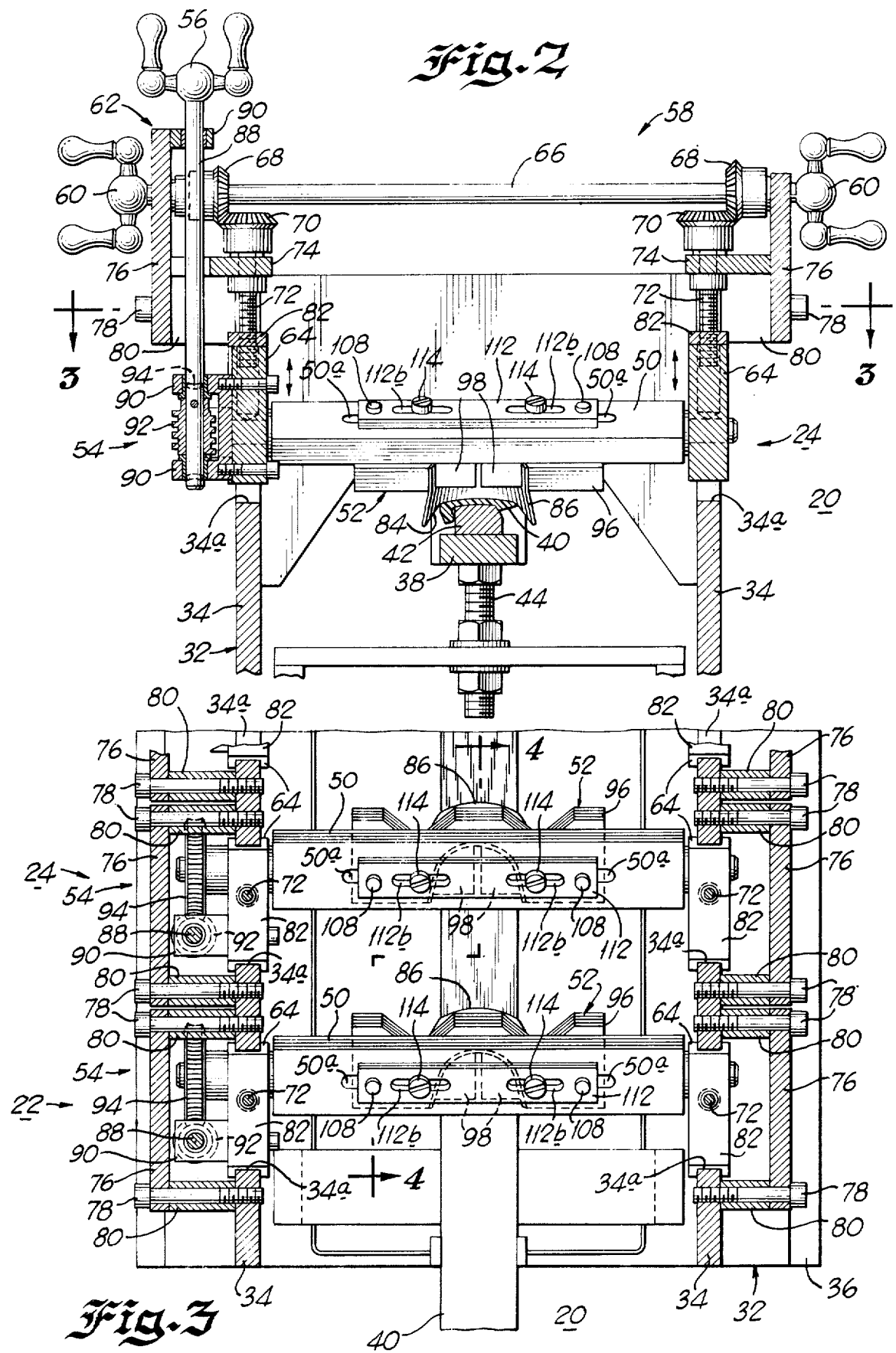

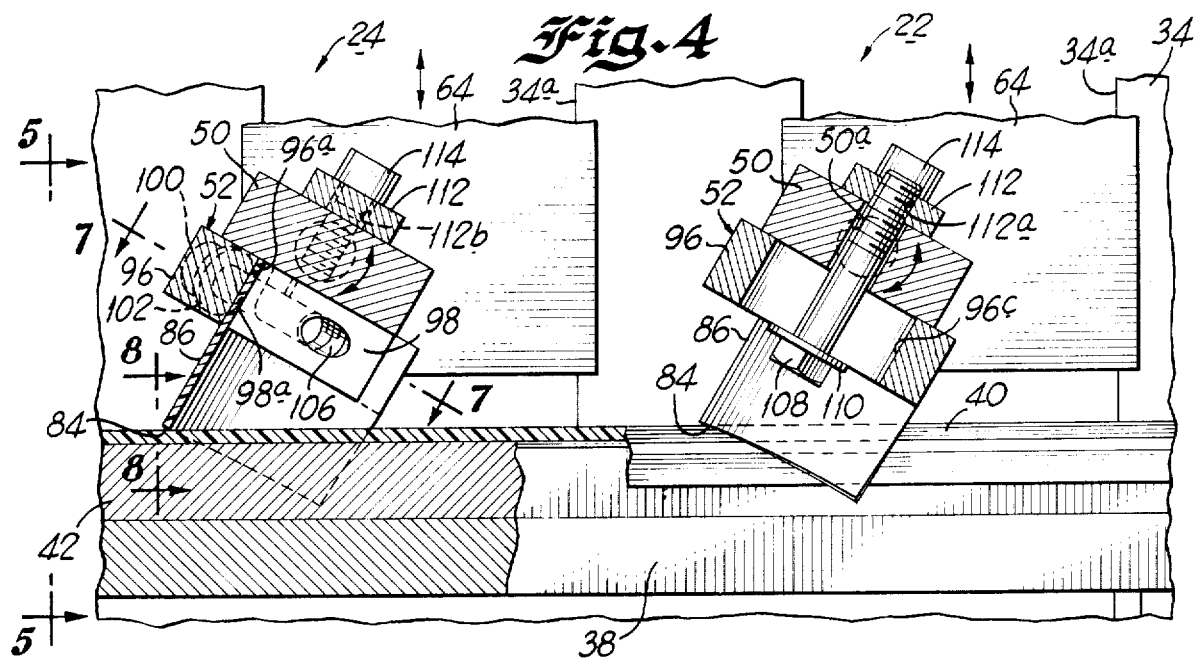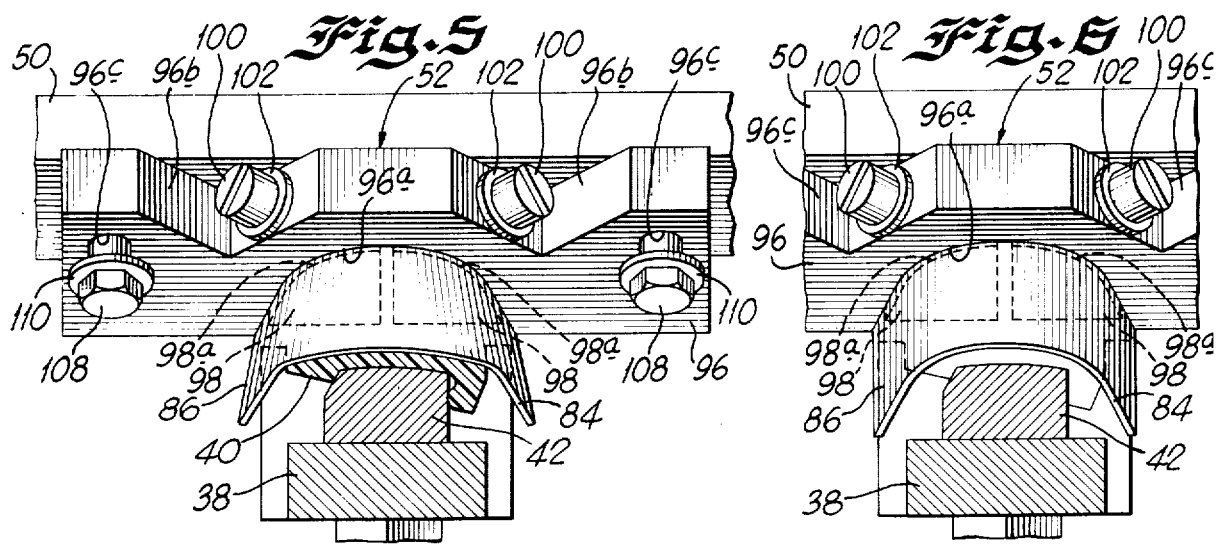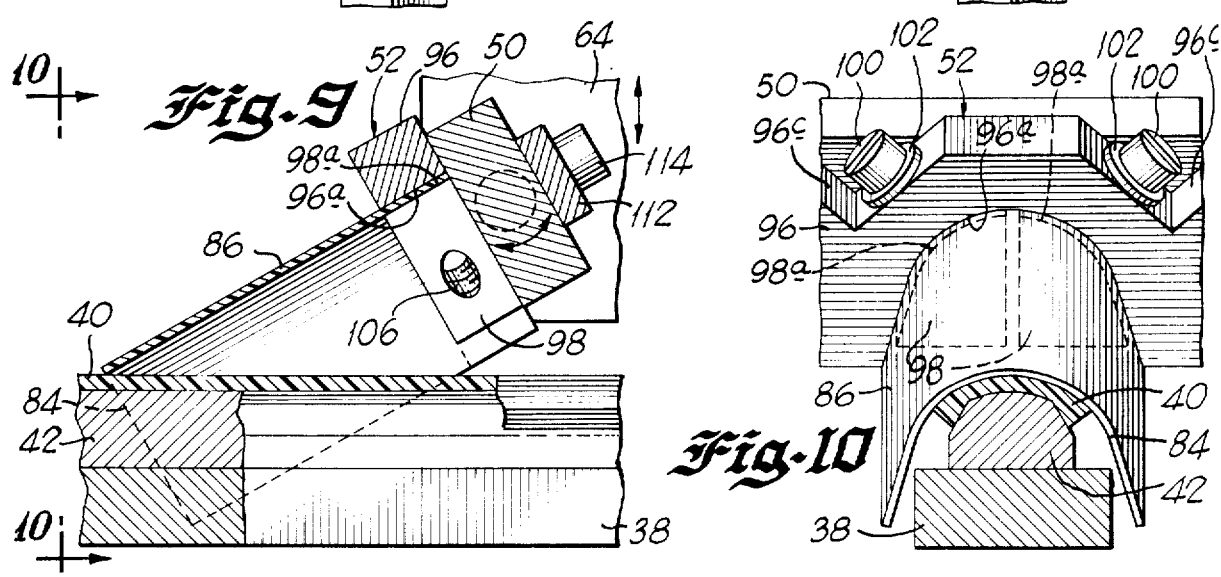

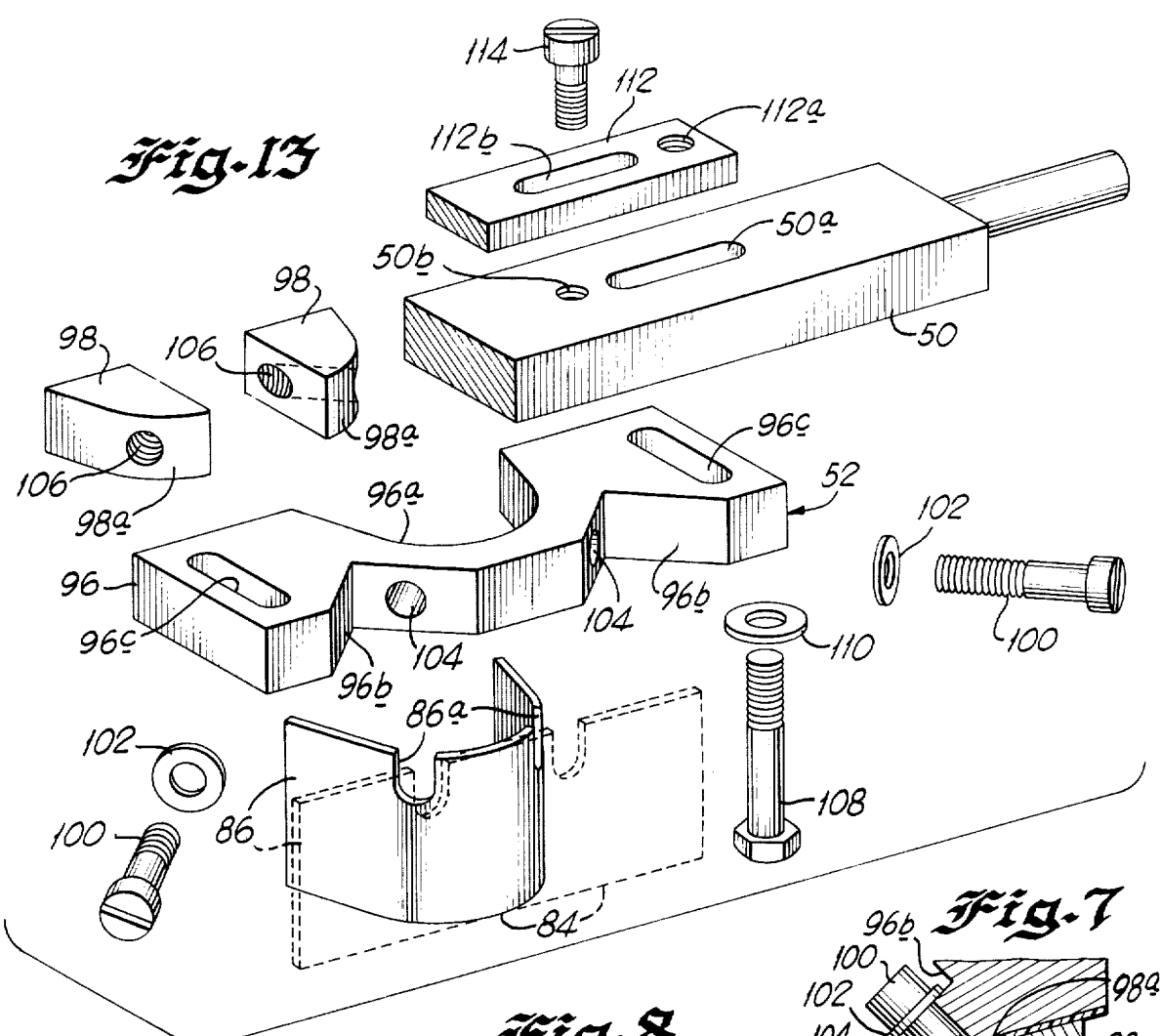
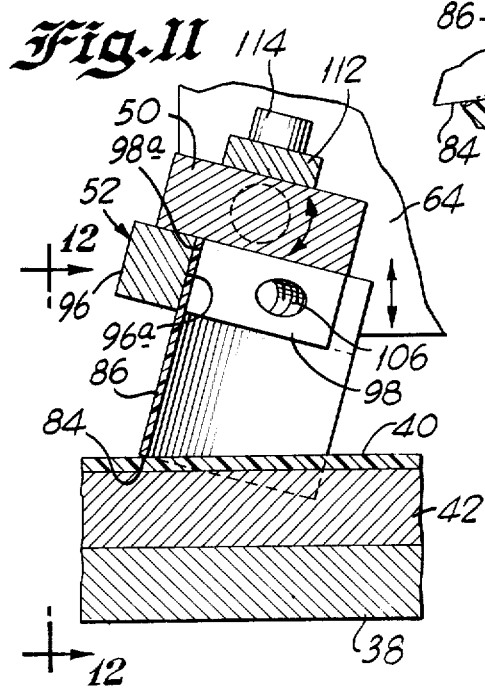
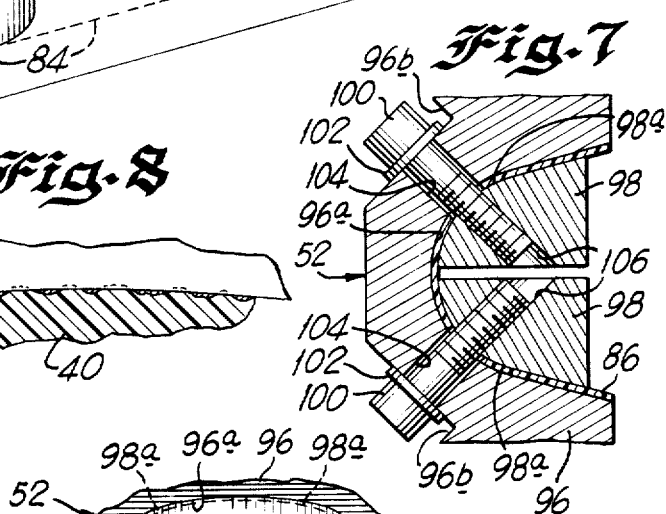
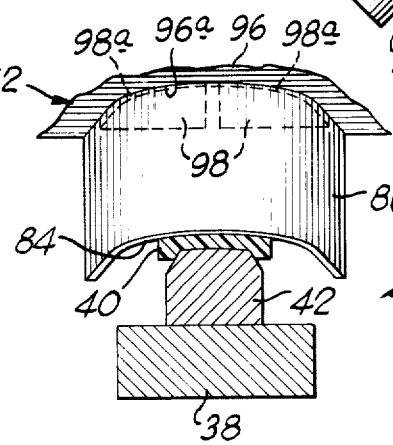

SCRAPING APPARATUS

Background of the Invention

A. Field of the Invention

This invention relates to coating apparatus generally and scraping apparatus for removing excess liquid from the surface of a substrate. More particularly, this invention relates to apparatus for removing excess paint from embossed moldings having surface contours of varying shapes.

B. Description of the Prior Art

A wide variety of apparatus has been developed for purposes such as wiping or polishing, pigment distributing, scraping, or removing excess liquid from the surface of a substrate. Some of the apparatus for these purposes is disclosed in the following United States patents. Ten Evck, Jr. No. 28,022; Herzog No. 700,493; Wulf - No. 1,934,157; Von Webern - No. 1,934,750; Way et al - No. 2,885,702; Carmichael et al - No. 3,166,440; Trant et al - No. 3,730,087; and Gallagher No. 3,788,219.

The wiping, distributing, or scraping member disclosed in each of the above patents is designed for use on the surface of a substrate having a particular shape. For example, the Herzog patent - U.S. Pat No. 700,493, employs a flat scraping member for scraping the surface of a flat substrate. The Ten Eyck Jr. patent - No. 28,022, discloses contoured scraping members each shaped to conform to a contoured molding member it is designed to scrape. For each different shape of substrate, the prior art apparatus provides a scraping member having a shape to conform thereto.

SUMMARY OF THE INVENTION

In accordance with the present invention, it has been found that a flexible scraping member secured to a scraping apparatus under tension will conform to a number of different surface shapes when the tensioned scraping member contacts a contoured surface under pressure. The greater difference in surface shape between the surface of the substrate and the flexible scraping member, the more pressure must be applied by the scraping member to the surface of the substrate.

It has been found that by providing the scraping member with an arcuate, flexible scraping edge, each different scraping angle between the arcuate scraping edge and the substrate will provide a scraping edge having a different curvature. The greater the included angle the less curvature is provided on the scraping edge. In this manner, a single scraping blade can provide complete scraping contact on the surfaces of many differently shaped substrates.

It has also been found that by shifting the center of the scraping edge of the scraping blade to the left or right of the center of the substrate, different degrees of curvature along the edge of the scraping blade can be shifted to points of greatest scraping advantage along the surface of the substrate.

Accordingly, it is an object of the present invention to provide apparatus for scraping the surface of contoured substrates.

Another object of the present invention is to provide apparatus capable of scraping the entire surface of a plurality of substrates having different surface contours.

Another object of the present invention is to provide scraping apparatus having a polymeric scraping blade capable of scraping a surface of a substrate without damaging the substrate.

Another object of the present invention is to provide scraping apparatus including a flexible scraping blade secured in the apparatus in such a manner that the blade is more flexible along a scraping edge than along a secured edge.

Another object of the present invention is to provide scraping apparatus capable of supporting scraping blades of different lengths wherein a longer scraping blade has a greater flexibility along the scraping edge and can better conform in shape to a sharply contoured substrate surface.

Another object of the present invention is to provide scraping apparatus having a plurality of scraping stations and a plurality of scraping blades to insure complete removal of a liquid, or to provide removal of a plurality of liquids from the surface of a substrate.

Another object of the present invention is to provide scraping apparatus having at least one liquid spreading station including at least one liquid spreading blade so that a liquid can be spread to completely coat the surface of a contoured substrate.

Another object of the present invention is to provide apparatus for coating only embossed or depressed areas of a contoured substrate such that the higher portions of the embossed substrate are scraped by a scraping blade to remove the liquid from the higher portions.

Another object of the present invention is to provide apparatus for scraping the surface of gradually contoured embossed molding by providing a flexible scraping member flexible enough to conform to gradual surface contours of the molding but not so flexible that the scraping member will remove a liquid from sharply embossed or depressed areas in the surface of the molding.

Another object of the present invention is to provide scraping apparatus including means for forcing a scraping member against the surface of a contoured substrate to a predetermined degree so that, if desired, less than all of a liquid can be removed from the surface of the contoured substrate.

BRIEF DESCRIPTION OF PREFERRED EMBODIMENT

Briefly, the device of the present invention comprises a substrate support member, at least one scraping blade support member having means for securing a scraping blade thereto, and a scraping blade removably secured to the scraping blade support member. Each scraping blade support member preferably includes means for rotating the support member. The scraping blade is forced into contact with the surface of the substrate so that the scraping blade edge conforms to the surface contours of the substrate.

It is an important feature of the present invention that the distance from the scraping blade support member to the surface of the substrate, and the length of the scraping blade are selected so that rotation of the blade support member, and therefore rotation of the scraping blade, will provide contact of the blade with the surface of the substrate at an angle in the range of about 10°–80°.

Another important feature of the present invention mentioned that each scraping blade is fabricated from a flexible material and is secured to the blade support member in an arcuate blade socket so that the blade is secured under tension in an arcuate shape. Before insertion into the blade socket, the flexible blade does not have the same curvature as the socket so that once secured, the blade is under tension. In this manner, the scraping blade edge will have a different curvature than the curvature of the blade edge secured in the socket. The blade is most flexible along a scraping edge, farthest away from the secured edge, so that by forcing the scraping edge of the blade against the surface of a substrate, the blade will conform to the surface contours of the substrate. Thus, a single blade can be used to scrape the surface of substrate having varying surface contours although each scraping blade has an arcuately disposed, substantially straight scraping edge. It is therefore not necessary to provide blades having different shapes to scrape different shaped substrates.

The blade support member is made adjustable so that it can be secured to the scraping blade support member at different distances from the surface of the substrate. Blades of different lengths, and therefore different flexibilities, can be provided in the apparatus. Further, the scraping edge of each blade can be made to contact the surface of a substrate at different angles of attack.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 2 is a fragmentary, transverse, sectional view taken along the line 2—2 of FIG. 1;

FIG. 3 is a fragmentary, horizontal, sectional view taken along the line 3—3 of FIG. 2;

FIG. 4 is an enlarged, fragmentary, sectional view taken along the line 4—4 of FIG. 3;

FIG. 5 is an enlarged, fragmentary, sectional view taken along the line 5—5 of FIG. 4;

FIG. 6 is an enlarged, fragmentary, sectional view similar to FIG. 5, but showing the scraping blade in an undeformed shape when not in contact with a substrate;

FIG. 7 is an enlarged, fragmentary, sectional view taken along line 7—7 of FIG. 4;

FIG. 8 is a greatly enlarged, fragmentary, sectional view taken along the line 8—8 of FIG. 4;

FIG. 9 is an enlarged, fragmentary, sectional view similar to FIG. 4 but illustrating a scraping assembly in accordance with the invention having a longer scraping blade with a greater blade curvature;

FIG. 10 is an enlarged, fragmentary, sectional view taken along the line 10—10 of FIG. 9;

FIG. 11 is an enlarged, fragmentary, sectional view similar to FIG. 9 but illustrating a scraping assembly having a relatively short scraping blade secured at a relatively steep included angle relative to the work piece;

FIG. 12 is an enlarged, fragmentary, sectional view taken along the line 12—12 of FIG. 11;

FIG. 13 is an exploded, perspective view of a portion of the scraping apparatus on the scraping assemblies of FIG. 1 constructed in accordance with the features of the present invention.

Description of the Preferred Embodiment

Figure 1:
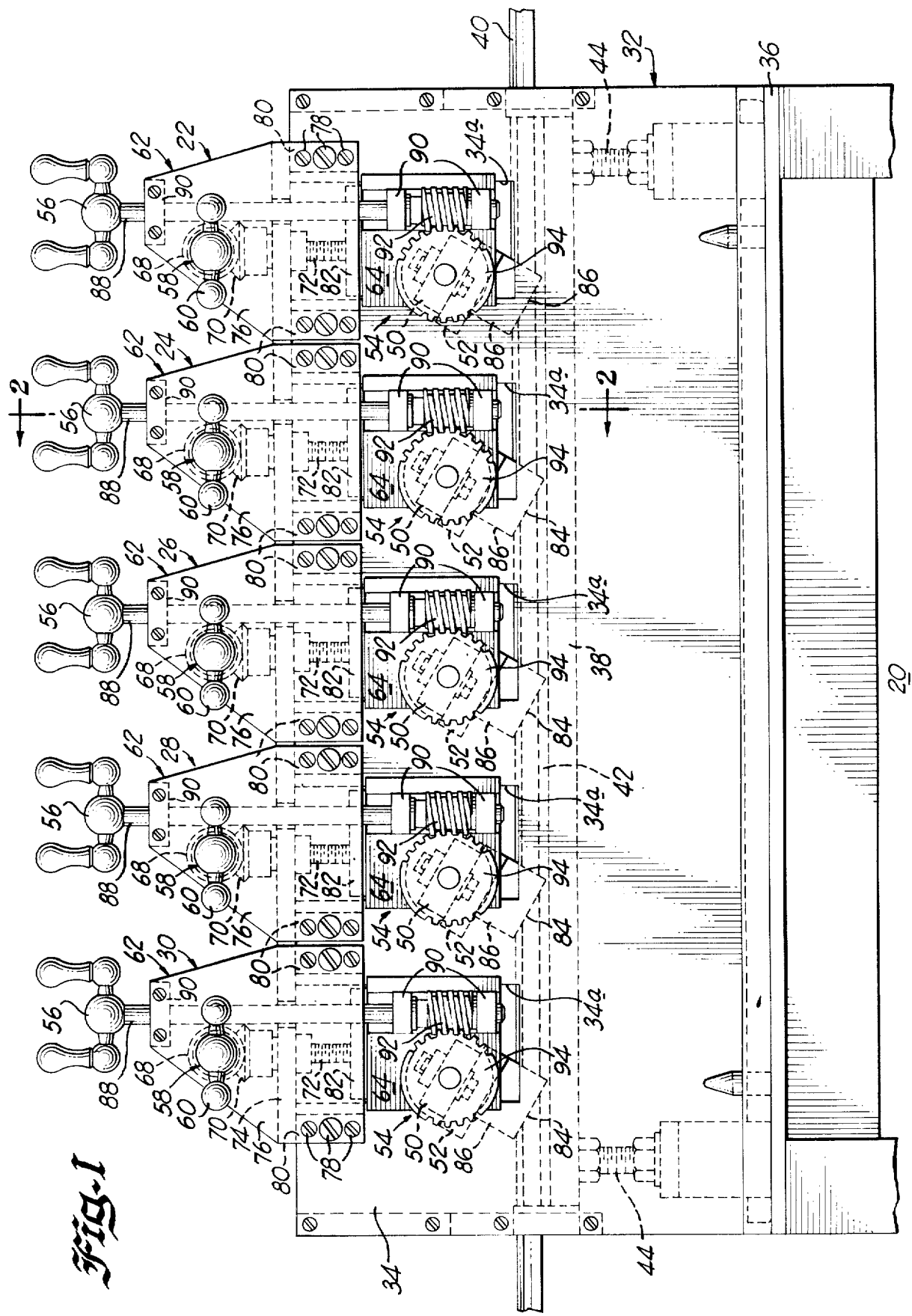
FIG. 1 is a side elevational view of a preferred embodiment of a scraping apparatus constructed in accordance with the principles of the present invention.

Referring to the drawings and initially to FIG. 1, there is illustrated a new and improved substrate coating apparatus 20 constructed in accordance with the principles of the present invention. The apparatus 20 includes a plurality of scraping assemblies 22, 24, 26, 28 and 30, carried on a frame 32 having a pair of parallel side members 34 and a base 36. The scraping assemblies can be used for spreading a liquid over the entire surface of a substrate as well as scraping the liquid from the surface. Each scraping assembly is capable of performing either or both functions. A generally horizontal substrate support 38 is provided for supporting the elongated strips of substrate 40 to be coated. An elongated guide strip 42 having a cross-sectional profile shaped to match the under side of the substrate 40 being handled is carried on the support 38 and the guide strip defines a path of travel for the substrate through the coating apparatus. Adjustable support posts are provided at the opposite ends of the support 38 to provide precise horizontal alignment of the substrate as it moves through the apparatus. The support posts 44 are adjusted for differences in depth of the guides 42 which are shaped to conform to the undersurface shape of the substrate that is being handled.

The scraping assemblies 22, 24, 26 28 and 30 are preferably identically constructed except for the particular blade being used and accordingly the same reference numerals will be used to describe similar parts in each unit, although only one of the units will be described in detail. It should be understood that one or more of the scraping assemblies may be used to spread a liquid over the surface of the substrate and that one or more scraping assemblies may be used to remove all or some of that liquid from the surface or at least higher portions of the substrate if desired.

With reference to FIGS. 1, 2 and 3, each scraping assembly includes a rotatable, scraping blade support 50, with a scraping blade socket assembly 52 mounted thereon, an assembly 54 for rotating the blade support member including a hand wheel 56, an assembly 58 for raising and lowering the blade support relative to the substrate 40 including a pair of hand wheels 60, and a frame or carriage 62 for holding the blade support 50 and the control assemblies 54 and 58.

The rotatable blade support includes a central body portion with a pair of stub shafts extending from opposite ends and the shafts are pivotally mounted on bearing blocks 64 disposed for vertical movement in slots 34a in the side members 34, as best shown in FIGS. 2, 3, and 4.

The blade raising and lowering assembly 58, best shown in FIG. 2, is provided for adjusting the vertical position of the scraping blade support 50 on the frame 62 and includes a horizontal shaft 66 having beveled gears 68 at opposite ends meshing with beveled gears 70 mounted at the upper ends of vertically disposed threaded shafts 72. The shafts 72 are supported for rotation in brackets 74 extending inwardly from side members 76 of the frames 62. The side members 76 are attached to sides 34 of the apparatus with machine screws 78 and spacer blocks 80. At the lower end portions the shafts 72 are engaged in threaded aperatures in cap members 82 secured to the top of the bearing blocks 64. When the hozizontal shaft 66 is rotated with either hand wheels 60 raising and lowering of the scraping blades support 50 is accomplished.

The blade support rotating assembly 54 is provided for the purpose of rotating the scraping blade support 50 to vary the angle and contact between the scraping edge 84 of a scraping blade 86 and the surface of the substrate 40. Each assembly includes a vertical shaft 88 supported by a plurality of brackets 90 (FIG. 2) and having a worm 92 at the lower end rotatively engaging the teeth of a gear 94 on the stub shaft of the scraping blade support member 50. By rotation of the hand wheels 56 the blade angle is adjustable so that the desired amount of pressure between the scraping edge 84 of the scraping blades 86 against the surface of substrate 40 is selectively controllable.

In accordance with an important feature of the present invention, each blade socket assembly 52 is adjustably secured on its scraping blade support 50 so that the blade 86 may be moved and adjusted in selected positions, either on center or to the left or right of the center of the substrate 40. It has been found that when a single flexible scraping blade 86 having a flat scraping edge 84 is bent under tension to form an arcuate scraping surface, a variety of substrates 40 having different surface contours can be handled. The upper end of the blade is firmly secured in place by the socket assembly 52 with a greater radius of curvature than that of the free scraping edge 84 of the blade. This is due to the fact that the blade 86 is firmly held under bending tension at one end and at the free end the blade tends to return to its unbent shape along the unsecured (scraping) edge 84. Total return of the free edge of the blade to an unbent shape along the scraping edge 84 is prevented because of the internal forces in the blade itself. The greater the distance between the secured upper edge of the blade and the free lower edge, the more the blade tends to flatten out and this results in less curvature along the scraping edge 84.

As best shown in FIG. 13, the scraping blade socket assembly 52 generally comprises a blade receiving body 96, having an arcuate slot 96a defined by an arcuate wall 97 and a pair of wedges 98 having arcuate faces 98a for forcing an upper end portion of the scraping blade 86 into engagement with arcuate wall surface 97. The arcuate faces 98a have a radius of curvature slightly less than the arcuate wall surface 97 of the socket member 95 to sandwich the upper end portion of the scraper blade 86 therebetween. The wedges 98 are drawn into tight engagement and held against the surface of the scraping blade by suitable fasteners, such as threaded cap screws 100 and lock washers 102. The shank of each cap screw passes through an unthreaded hole 104 extending between the arcuate slot 96a and a triangle slot 96b on the opposite side of the socket body 96 and is threaded into a bore 106 in the wedge member 98. The upper edge of the blade 86 is provided with a pair of U-shaped, open ended slots 86a for accomodating the shanks of the cap screws 100 which pass therethrough.

The blade socket body 96 is removably and adjustably secured to the rotatable socket support 50 by a first pair of cap screws 108 and lock washers 110, and the cap screws project upwardly through elongated transverse slots 96c in the blade socket body, elongated longitudinal slots 50a in the socket support body 50 and are threaded into apertures 112a of a lock bar 112. (FIG. 13).

A second pair of cap screws 114 include threaded shanks which pass downwardly through elongated longitudinal slots 112b in the locking bar 112 and are threaded into holes 50b in the rotatable blade support 50.

Each of the blade assemblies 22, 24, 26, 28 and 30 of the apparatus 20 of the present invention adjustably and precisely supports a flexible scraping blade 86 with the upper end portion secured in an arcuate curvature under tension with a free lower end having a scraping edge 84 for contact with a substrate 40. As set forth herein, the scraping blade support 50 is both rotatable about a horizontal axis and is vertically adjustable to take the best advantage of the freely curved scraping blade lower edge 84 which contacts the moving substrate 40.

Different angles of attack between scraping blade and substrate can be provided by rotatable adjustment of the hand wheels 56 and by scraping blades of different lengths as shown in FIGS. 4 and 9. Different angles of attack can also be provided by raising or lowering the blade supports and socket assemblies 52 (as shown in FIG. 11) with adjustment of the hand wheels 60. It has been found that as the included angle an angle of attack between the substrate 40 and the scraping blade 86 approaches 90°, the scraping edge 84 tends to form a flat or nearly linear scraping surface across the width of the substrate (FIGS. 8, 11 and 12). As the angle is reduced to smaller values, (FIG. 9) more advantage is taken of the flexible curvature of the scraping edge 84 so that substrates 40 having greater surface curvature can be contacted over their entire width by the scraping edge of scraping blade. In addition, the amount of curvature of the flexible scraping blades can be varied by changing the radius of curvature of the arcuate wall surface 96a and the surfaces 98a of the wedges 98. Flexible blades having different curvatures, in addition to different lengths, are shown in FIGS. 6 and 10.

In addition to the above adjustments made to provide for different surface curvatures in a substrate 40, the scraping blade support 50 can be rotated to provide more or less contact pressure between the scraping edge 84 of a scraping blade 86. More pressure exerted on a scraping edge 84 will tend to flatten out the edge against the substrate and compensate for different curvatures in the substrate even though the lower scraping edge 84 of the blade is originally straight. The flexibility of or resilience of the scraping edge of a blade is important in achieving varying degrees of conformity of scraping edge over the entire width of a substrate even though it be irregular. In very few cases will it be possible to adjust the general angle of attack of a scraping blade or to the scraping blade at such an angle such that the curvature of scraping edge 86 will exactly conform to the curvature of the surface of the substrate 22. In these cases it is desirable to provide enough contact pressure on scraping edge to flex the edge to conform to the surface profile of the substrate being handled.

In accordance with an important feature of the invention, the slots 50a, 96c and 112b enable a scraping blade carried in each assembly to be angularly shifted relative to the longitudinal axis of the substrate 40. By adjustment in this manner, the greatest curvature inherent along a scraping edge 84 of a scraping blade 86 can be shifted to different points across the width of substrate. The point of greatest curvature on the free edge of the scraping blade can be present to coincide with the point of greatest curvature across the width of the substrate to assure complete scraping over the entire surface width of the substrate.

It is preferred to fabricate scraping blades 86 from polyolefin materials such as polyethylene or polypropylene because polyolefins have a natural lubricity for scraping plastic moldings and do not damage the substrate. In addition, long life is achieved in comparison with other materials and the amount of power required to move the substrate 40 through the apparatus 20 is reduced. Excellent results were obtained with a blade of high density polyethylene having a thickness of .030 inch. Other materials used in thicknesses ranging from .005 to .040 inch are "Nylon", "Teflon", "A.B.S." plastic, ¼ inch thick felt backed by a spring steel blade having a thickness of .007 inch, polyvinyl chloride and high impact polystyrene. The polyvinyl chloride and high impact polystyrene blades function effectively but do not have sufficiently long useful lives to be commercially feasible.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. Apparatus for scraping a surface of a substrate comprising:
    substrate support means for supporting a substrate and defining a path of travel of said substrate through said apparatus,
    scraping blade support means for supporting a flexible scraping blade for contact against a surface of said substrate moving along said path,
    a flexible scraping blade secured in said scraping blade support means to form an arcuately curved scraping edge in contact against said substrate, and
    means for adjusting the contacting pressure of said arcuate scraping blade edge against said surface of said substrate.

2. Apparatus as defined in claim 1 wherein said flexible scraping blade has a free edge forming said scraping blade edge and an opposite edge secured in said scraping blade support means under tension so that said secured edge has a greater amount of curvature along an incremental distance therealong than the amount of curvature of said arcuate scraping edge along a corresponding incremental distance thereof.

3. Apparatus as defined in claim 1 wherein the flexible scraping blade is fabricated from polyolefin material.

4. Apparatus as defined in claim 3 wherein the polyolefin material is selected from the group comprising polyethylene and polypropylene.

5. Apparatus as defined in claim 2 wherein said scraping blade support means includes a blade receiving socket having an arcuate wall portion for engaging an end portion of said scraping blade along said secured edge.

6. Apparatus as defined in claim 5 further comprising means for biasing said end portion of said scraping blade against said arcuate wall portion thereby securing said scraping blade to said support means.

7. Apparatus as defined in claim 1 further comprising means for positioning said scraping blade at a selected one of a plurality of different angles relative to a surface of said substrate.

8. Apparatus as defined in claim 7 wherein said blade support means is operable to hold said scraping blade in contact with said substrate at an included angle up to a maximum of approximately 80°.

9. Apparatus as defined in claim 1 further comprising a second srapher blade support means for supporting a second flexible scraping blade for contacting said substrate moving along said path a point spaced from a point of contact of said first mentioned scraper blade,
    a second flexible scraper blade having an arcuately curved free edge in contact against said substrate in said blade support means along said arcuate secured edge, and
    a second means for adjusting the pressure of contact between said arcuately curved edge of said second scraper blade against a surface of said substrate.

10. Apparatus as defined in claim 1 further comprising means for varying the distance between said scraper blade support means and said travel path for accomodating different scraping angles and/or scraping blades of different lengths.

11. Apparatus as defined in claim 7 wherein said means for positioning said scraping blade at a selected one of a plurality of different scraping angles relative to a surface of said substrate includes means for rotating said blade support means about an axis of rotation transversely of said travel path.

12. Apparatus for scraping a continuously moving substrate having a curved surface comprising:
    means for supporting the substrate along a linear path of travel through said apparatus,
    socket means for securing one end of a flexible scraping blade having a free outer end defining a scraping edge, said socket means having an arcuate wall surface,
    a flexible scraping blade secured in said socket with said one end biased against said curved wall surface, and
    means for positioning said scraping blade at a selected one of a plurality of different angles of contact between said scraping edge and a surface of said substrate.

13. Apparatus as defined in claim 12 further including means for moving said scraping blade toward and away from said travel path generally normal to said substrate.

14. Apparatus as defined in claim 12 wherein said scraping blade has a longitudinal axis and further including means for moving said axis of said to selected ones of different angles relative to said travel path of said substrate.

* * * * *